United States Patent [19]

Nicholas

[11] Patent Number: 4,912,701

[45] Date of Patent: Mar. 27, 1990

[54] PACKET SWITCHING MODULE

[75] Inventor: David C. Nicholas, Cedar Rapids, Iowa

[73] Assignee: Rockwell International Corporation, El Segundo, Calif.

[21] Appl. No.: 137,038

[22] Filed: Dec. 23, 1987

[51] Int. Cl.⁴ .......................................... H04Q 11/04
[52] U.S. Cl. ...................................... 370/60; 370/67; 370/94.1
[58] Field of Search ................... 370/60, 94, 67, 85

[56] References Cited

U.S. PATENT DOCUMENTS

| | | | |
|---|---|---|---|
| 4,525,830 | 6/1985 | Cohen et al. | 370/60 |
| 4,556,972 | 12/1985 | Chan et al. | 370/60 |
| 4,649,534 | 3/1987 | Manjarres | 370/60 |

Primary Examiner—Robert L. Griffin
Assistant Examiner—Wellington Chin
Attorney, Agent, or Firm—C. B. Patti; V. L. Sewell; H. F. Hamann

[57] ABSTRACT

A packet switching module connects to a multiplexed carrier line which has at least an input line and an output line. A receiver circuit receives an information frame over the multiplexed carrier line. The information frame has a predetermined format which includes a physical destination address. A plurality of processing modules and a controller are connected to a common memory and switching the packets according to the destination addresses. The new information frame is outputted on the multiplexed carrier line by a transmitter circuit.

6 Claims, 7 Drawing Sheets

PACKET SWITCHING MODULE

BACKGROUND OF THE INVENTION

The present invention relates in general to telephone switching circuits and, in particular, to methods and devices for constructing very large integrated voice and data switching systems which are highly modular.

Key features not found in prior art approaches include:
a modular circuit switch
a modular packet switch
the use of the circuit switch to interconnect to packet switching modules
the making of each element of the system a data "subscriber" of the system along with the external users so that external user data and internal control data can be switched by the same mechanisms.

In a typical application, the overall system consists of:
a modular circuit switch handling 64K bps digital circuits in many 24 channel multiplex groups. These may carry digitized voice, circuit switched data, or data packets.
Subscriber and trunk termination devices which generate one or more 24 channel groups. Normally one (or more) of the 24 channels in each group will be used to carry both system control data and user data a combined packetized stream with the packets of the subscribers and the system control data comingled. The data circuit or circuits from each group are semi-permanently connected ("nailed through") the circuit switch to 24 channel multiplexed circuits which now consist entirely of 64K bps data circuits from various sources. These combined data circuits are in turn connected to:
a modular packet switch in which each module has at its input one of these combined circuits consisting of 24 64K bps packet streams.

The architecture of the system simplifies the mechanization of the control system as controlled devices within the system are also "subscribers" of the packet switching system in addition to the external or regular subscribers. This much of the system control traffic can use the same mechanisms as the user data.

The modules of the packet switch are then interconnected, for example, in a fashion which logically resembles a three-stage space switch with interconnections at the 64K bps level. These connections are actually provided with further semi-permanent connections in the circuit switch.

Finally, a redundant control system is provided to control the whole system.

SUMMARY OF THE INVENTION

A packet switching module connects to a multiplexed carrier line which has an input line and an output line. The input and output line each carry 24 individual 64K bps data circuits and a small amount of framing data which allows the 24 individual channels to be identified. Each of these 64K bps channels carries packets of data in a predetermined format which includes a destination address. Within the packet switching module, a plurality of processing models each examine one or more of the individual 64K bps channels for the destination addresses of the packets and load the entire data packet into a memory common to all the processing modules and carriers to a controller. The controller then examines the address of each packet, determines on which one of the 24 outgoing channels the packet should be routed, and alerts the processing module handling the outgoing channel to the location of the packet in common memory for subsequent transmission.

In summary, the module itself simply provides for packets arriving on one of 24 channels, all contained in a single T-carrier multiplexed circuit, to be routed out on the same or another of 24 channels contained within a corresponding outgoing T-carrier multiplexed circuit.

The power of the invention is that these simple modules can then be interconnected by semi-permanent connections in a digital circuit switch to form very large multi-stage arrays.

If, for example, three-stage arrays are used, they can not only become very large but also take on desirable alternate routing characteristics which can insulate them from the effects of single point failures.

OBJECT OF THE INVENTION

It is a general object of the present invention to provide an integrated voice and data switching system with a very large packet switching capability.

It is a further object of the present invention to provide for modular growth in both the circuit switching and packet switching portions of the system and limit the effects of single point failures in the packet switching portion as they have been limited in circuit switches.

It is a further object of the present invention to integrate user packet data and system control packets onto the same physical circuits and switches and to use the same circuits as one used for user circuit switching.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

The present invention relates to a general purpose switching system for voice and data applications. This system features a line capacity range from about 192 lines up to about 10,000 to 12,000 lines and/or about 3000 trunks. In addition to circuit switched 64K bps voice and data service, the system provides each subscriber line with access to a powerful X.25-based packet switching service as well. Larger tandems and ACD systems are also addressed.

The system is modular. No single point failure affects more than 6 lines, the modularity of the line unit; however, certain single point failures can reduce the traffic capacity of a 384 line group by 25%.

Figure 1:
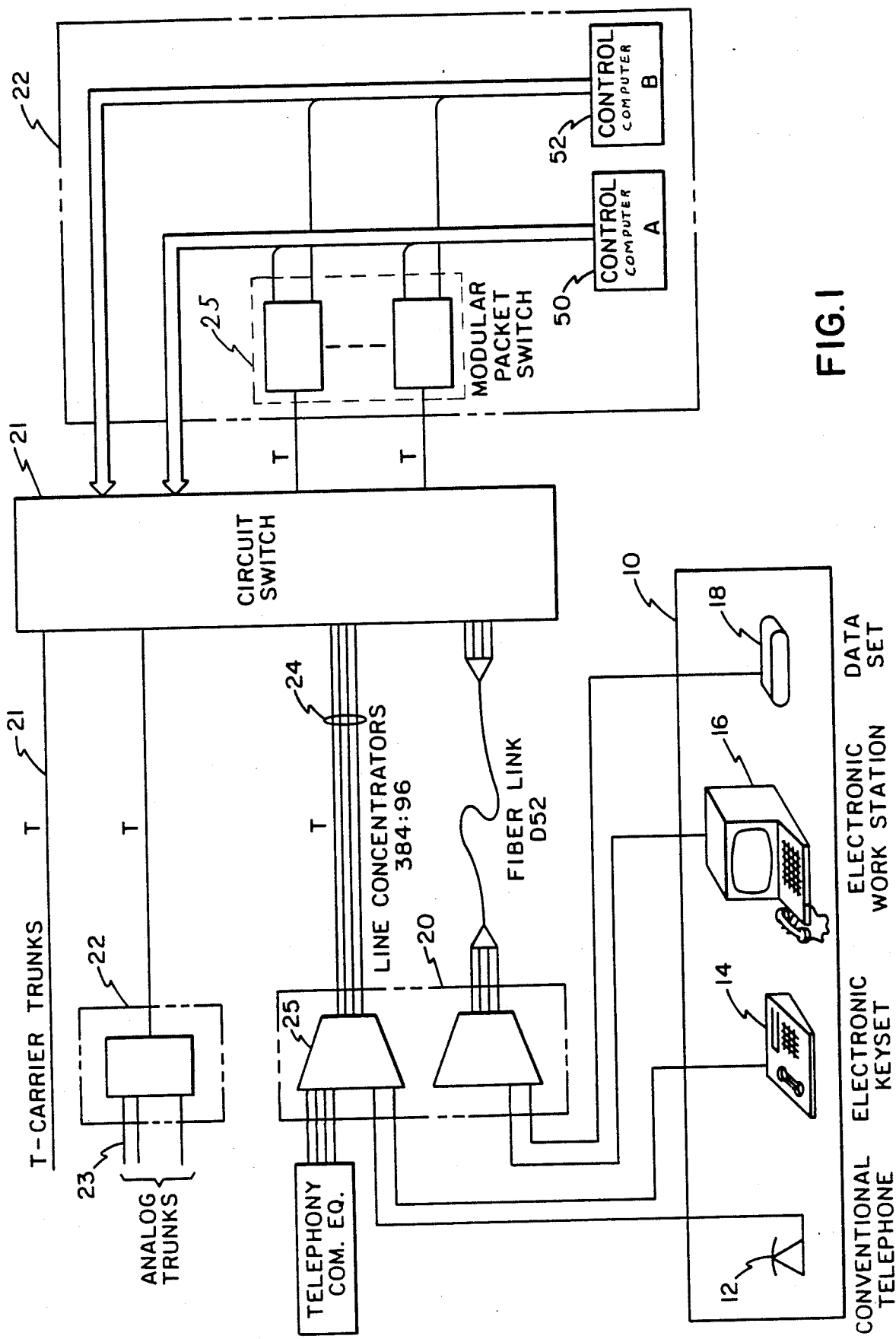
FIG. 1 is a general block diagram illustrating a typical environment in which the novel modular packet switch is used.

FIG. 1 shows a block diagram of the system.

This system can be more fully described in terms of its four canonical elements:

Instrument System, 10;
Line & Trunk Terminations, 20, 22;
Switch, 21; and
Control System Complex 22, including the modular packet switch 25, and dual control computers 50 and 52.

The instrument system consists of four categories of devices with voice and/or data capability, namely:

Conventional telephones, 12;
Electronic keysets, 14;
Electronic work stations, 16, with voice and data capability; and,
Data sets, 18, with no voice capability.

The system supports conventional DTMF and rotary dial telephones. Conventional two-wire lines connect these instruments to the system at the line termination equipment 20.

The system supports electronic key sets 14. These instruments are primarily designed to serve as stations of an integrated key system but with certain additional electronic mail functions implemented via a small display. For example, communication with the system can be via a two-wire voice circuit with 2400 bps, half-duplex, data over voice on the same pair using for example, a 32Khz carrier for the data.

The system also supports electronic work stations 16 with a full CRT display, a full keyboard, and an ISDN 144K bps full-duplex data link supporting two 64K bps, voice or data, circuit-switched circuits and one 16K bps packet switched data circuit.

Certain of the electronic work stations may be provided with an internal data set 18, providing simultaneous voice and circuit switched data service in conjunction with an add-on, foreign data terminal. Packet switched data service is, of course, always available. Additionally, for certain applications, the work station keyboard and CRT can communicate directly with a circuit switched data connection, either in an alternate voice-data mode or in a simultaneous voice-data mode, depending on whether the termination provides one or two 64K bps switched circuits. Additionally, X.25-based packet service remains available in either mode. Both the electronic telephones 14 and the electronic work stations 16 communicate using the same X.25-based packet protocol at their respective speeds of 2400 bps and 16K bps.

Occasionally, the electronic workstation 16 may require packet communication at burst rates greater than 64K bps. In this case, the electronic workstation 16 can "dial-up" a 64K bps circuit directly into one at the 64K bps ports of the packet switch.

The system also supports data sets 18 via a 144K bps link utilized for the electronic work stations 16. These units provide 0–19.2 X bps asynchronous, and 64K bps synchronous, circuit-switched data connections via two 64K bps voice-data channel(s), and X.25-based packet switching via a third 16K bps channel. The system's packet switching facilities are available for control purposes or other purposes.

The family of data sets 18 extends to higher speed units using multiple 64K bps channels.

Figure 2:
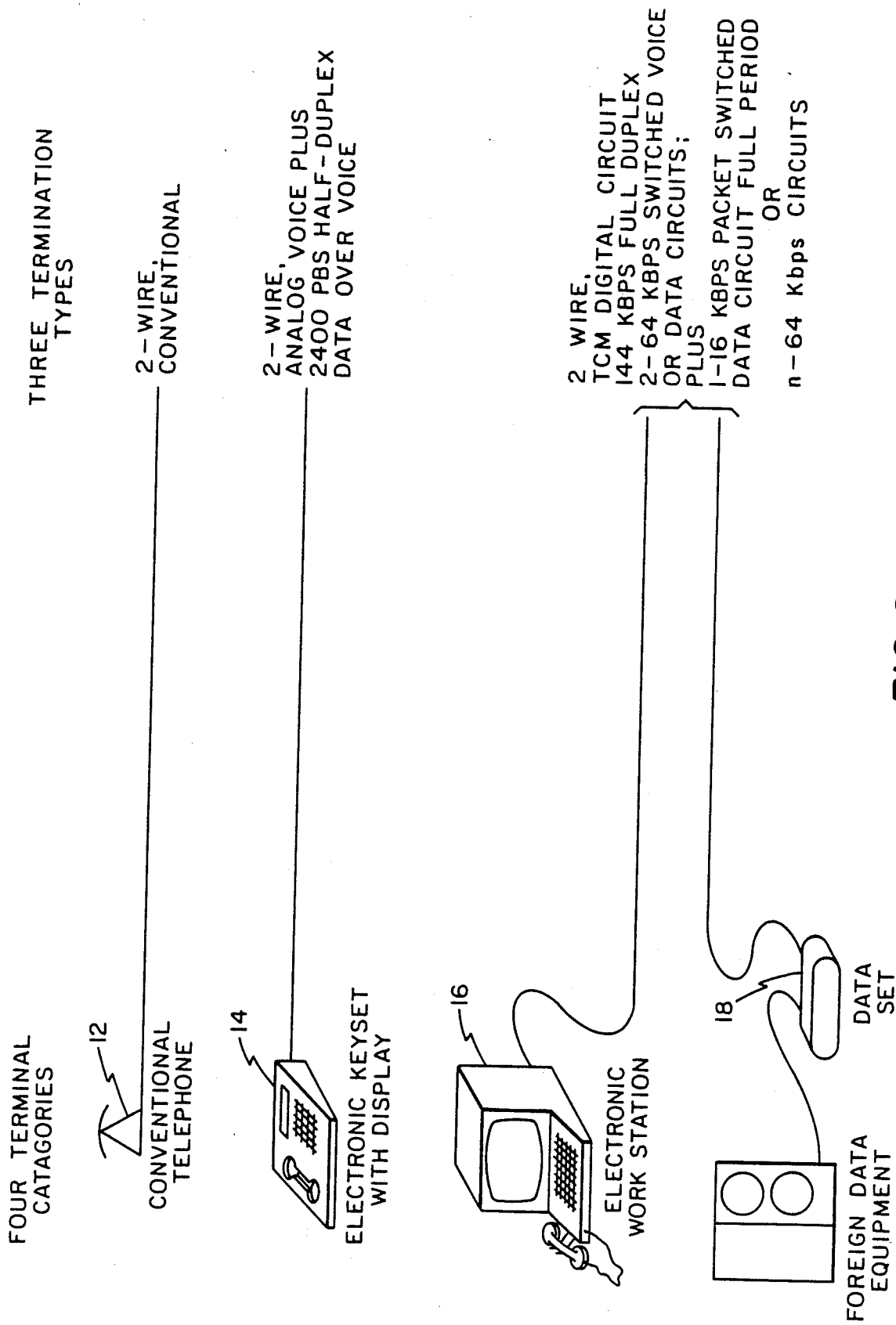
FIG. 2 is a diagram depicting various telephone equipment used in the FIG. 1 system.

FIG. 2 depicts the various instrument types.

The switch subsystem, described later, provides only 24 channel extended frame format T-carrier interfaces (or optional CCITT G. 732 30 channel service). The termination equipment adapts all circuits to this format. Current D3 T-carrier format is accommodated as a subset of extended frame format.

T-carrier trunks 21 bypass the termination system and connect directly to the switch 21. Analog trunks 23 terminate via high density trunk termination equipment 22. Any conventional D3 or D5 (extended frame) channel bank may also be used. The X.25-like common control channel of D5 channel bank is interfaced in the switch 21 and extended to the control system 22 via a switch control interface.

All types of subscriber lines terminate in a concentrating termination unit 25 which terminates from 48 to 384 circuits and generates four T-carrier circuits 24 for transmission toward the switch 21. Each T-carrier circuit provides 23 64-K bps circuits for data or voice circuit switching and one 64K bps circuit utilized for X.25-based packet switching. Each termination unit 25 contains a dual, redundant microprocessor based control unit which controls the concentration switching for the 64K bps circuits and which interfaces the 64K bps control links toward the switch 21. The control unit 25 forwards packets received from the electronic telephones 14, and workstations 16, and generates control packets of its own.

While concentration is provided for 64K bps voice circuits, both the 2400 bps data circuits to the electronic telephones 14 and the 16K bps data circuits to the electronic work stations 16 are available to all users at all times. Thus, a combined data rate of 256K bps consisting of four 64K bps channels to and from the packet switching facilities of the switch control system is available to service 385 devices. The burst rate available to each device is 2400 bps, 16 or 64K bps respectively.

The line termination 25 may be located in remote locations. To facilitate this, provision is made in the control system to utilize 56K bps control channels when extended frame T-carrier is not available. Provision is made to utilize 9600 bps control channels when only analog facilities are connected when a community of interest exists. Obviously, the 384 line concentrator can become a small stand-alone switch with the addition of control equipment.

The line termination provides three basic termination types not including the higher speed versions of the digital termination. These are:

(1) Conventional telephone: two wire, loop start, tip and ring service;

(2) Electronic keyset; two wire conventional service with a 2400 bps half-duplex data circuit;

(3) Digital termination: two wire, TCM service at 144K bps in each direction providing two 64K bps circuits (which can be used for voice or data) and one 16K bps X.25-based circuit used for communication with the control system. The digital termination serves both the electronic work stations and data sets. This termination type also extends to higher speed units which permit a data set to utilize a multiple 64K bps circuit to achieve higher rates.

The circuit switch 21 proper provides virtually non-blocking 64K bps transparent circuit switched connections between any channel in a connected T-carrier circuit and any other channel. Since the line termination equipment provides 4:1 concentration, a relatively small central switch supports a larger group of subscribers. A switch of 128 T-carrier circuit capacity would support 768 subscribers and 912 trunks. The allocation of T-carrier circuits is:

| FUNCTION | NUMBER OF T-CARRIER CIRCUITS |
| --- | --- |
| Line Termination | 80 |
| Trunks | 38 |
| Service circuits | 6 |
| Termination of packet control links (primary & and backup) | 4 |
| TOTAL: | 128 |

This switch 21 is modular by 24 or 48 circuits in order to limit the effects of failures. While the switch concentrates groups of twenty-four 64K bps packet control channels and routes these out on four T-carrier circuits to control interface units 25, the switch 21 does not itself monitor or modify the data. Thus, internal signaling in the switch is required only to interface the extended frame T-carrier circuit in its D3form and to receive and forward the X.25-based 4 Khz messages in the common channel version of extended frame format. In the system shown here, the T-carrier circuit switch forwards these messages directly to the control system. Messages not intended for the control system can be retransmitted to the packet switch.

The control system 22 of the system consists of:
the primary and backup common control computers 26, 28, and their conventional peripherals 30 which are shown simplified as items 50 and 52 in FIG. 1;
the telephony peripherals 32;
the modular packet switch 34; and
the microprocessors controlling the individual concentrators.

Figure 3:
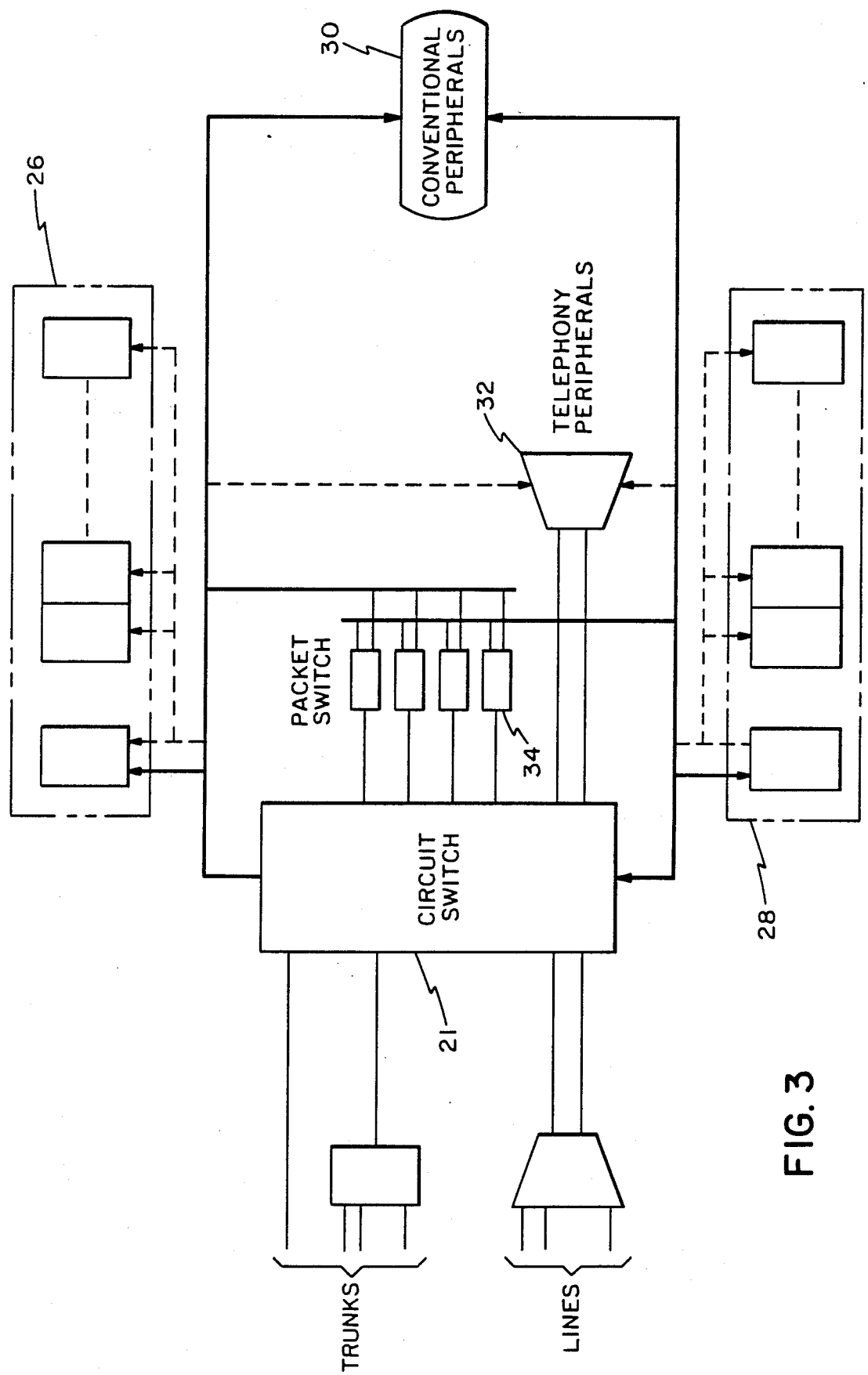
FIG. 3 is a general block diagram of a central system used in the FIG. 1 system.

The elements and their relationships are shown in FIG. 3.

Figure 4:
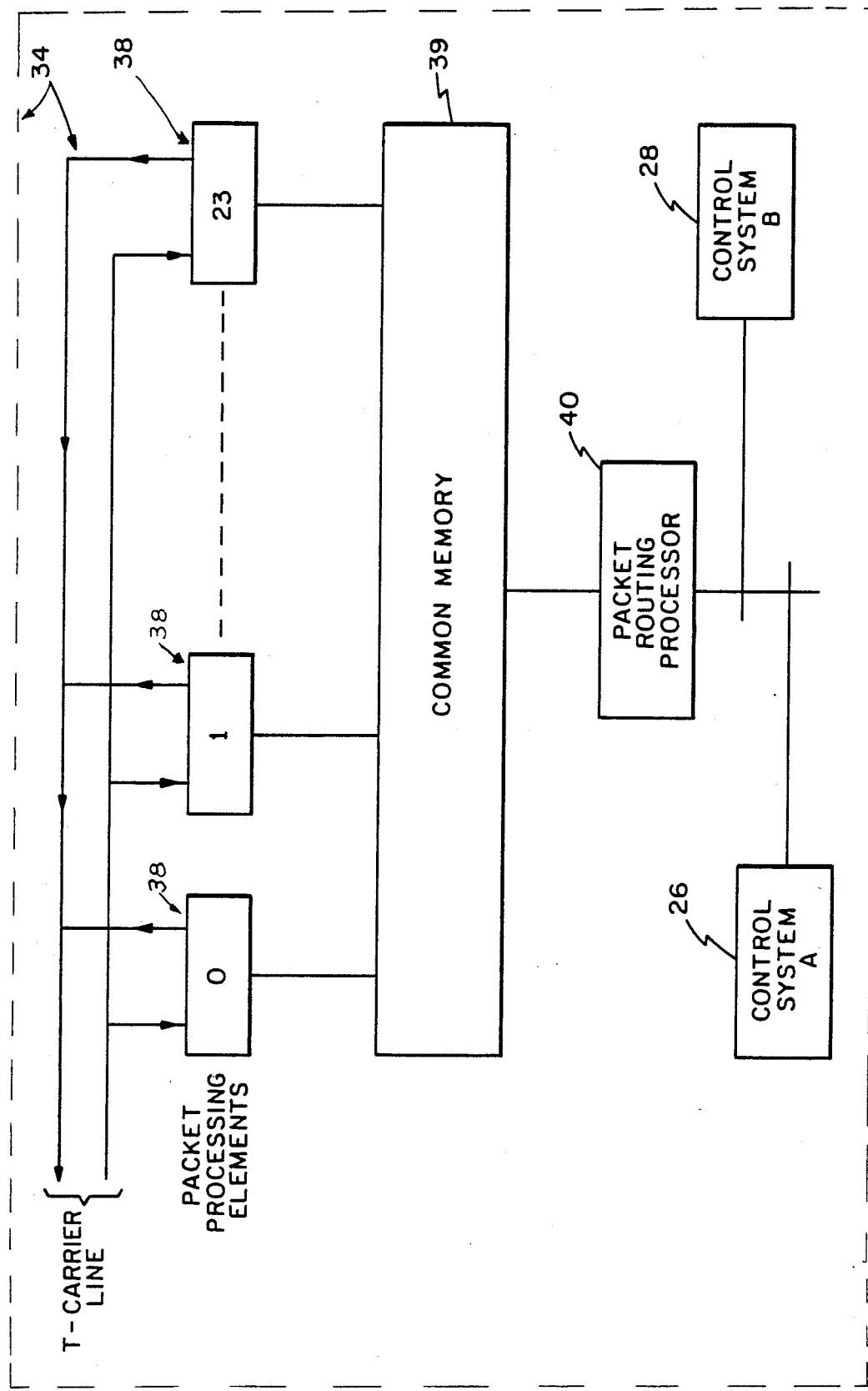
FIG. 4 is a general block diagram of a packet switching module.

Within each packet switching module 34, the packet routing processor 40 also has a dual interface to the A and B control systems 26, 28, of the system. This is illustrated in FIG. 4. Control messages will originate and terminate in the packet switching module 34 and will be forwarded via these links to the A or B control system 26, 28. These links to the control system also provide the initial load and updates to packet routing tables. Control messages include the initial request to the control system and response by the control system for physical addresses for terminal-to-terminal data communications.

Terminal-to-terminal messages need not enter the control system 26, 28, after the control system 26, 28 provides the packet routing processor 40 routing tables, and physical addresses for terminal-to-terminal communication.

A key element of this system is a large efficient packet switching system to handle the extensive data traffic.

An important feature of this invention is that it provides a very clean way to build very large packet switching systems, whether concentrated, distributed or both. A key element in being able to do this is to first have the user request, automatically of course, the physical address of the destination from some system controller. In order to accomplish this, the user device must know only the physical packet address of the system controller 26, 28 in order to send as a packet this initial request for the physical address of the destination. This is returned to the requesting user as a packet. Each packet then is transmitted containing this physical address which greatly reduces the amount of information each of the multiplicity of packet switching modules must have in order to forward the packet toward its destination.

Figure 5A:
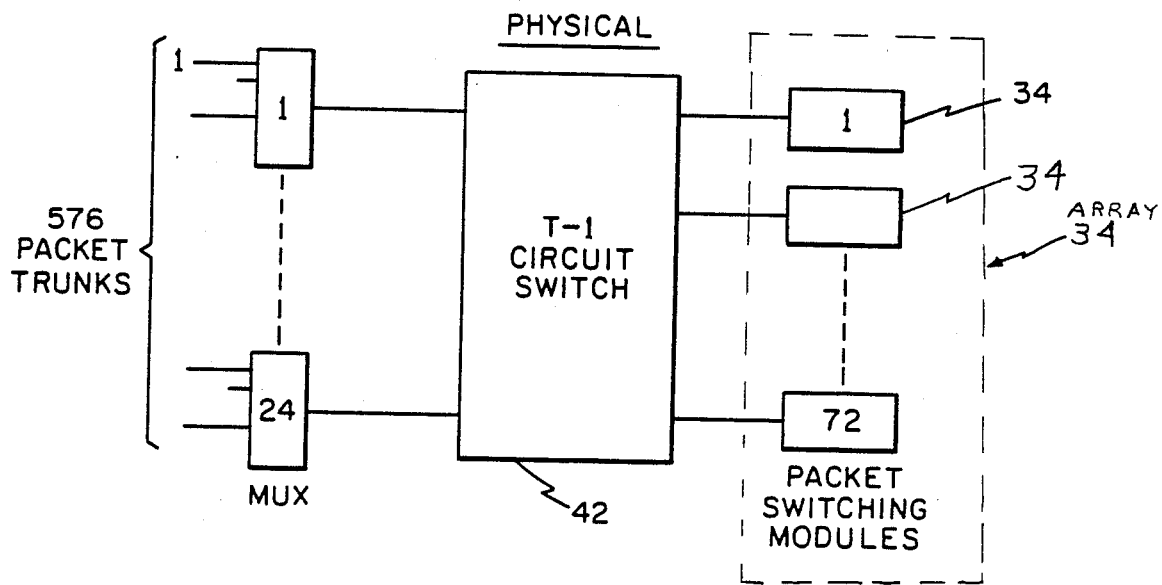
FIG. 5A and 5B show the physical and logical connection of a plurality of packet switching modules.

The operation of the module is best explained by reference to FIGS. 5A and 5B which shows the physical and logical interconnection of packet modules 34.

Physically each packet switching module 34 is serviced by a multiplexed carrier circuit providing 24 multiplexed 64,000 bps circuits within a 1.544M bps format. The multiplexed circuit switch 42 in FIG. 5A is able to extract from an incoming T-carrier line an individual 64,000 bps channel and insert that into an outgoing T-carrier line. Thus, while each packet switching module 34 has but a single 1.544M bps input and single 1.544M bps output as shown in FIG. 4, it may be thought of as having twenty-four 64,000 bps inputs and twenty-four 64,000 bps outputs as shown in the lower FIG. 5B.

Figure 5B:
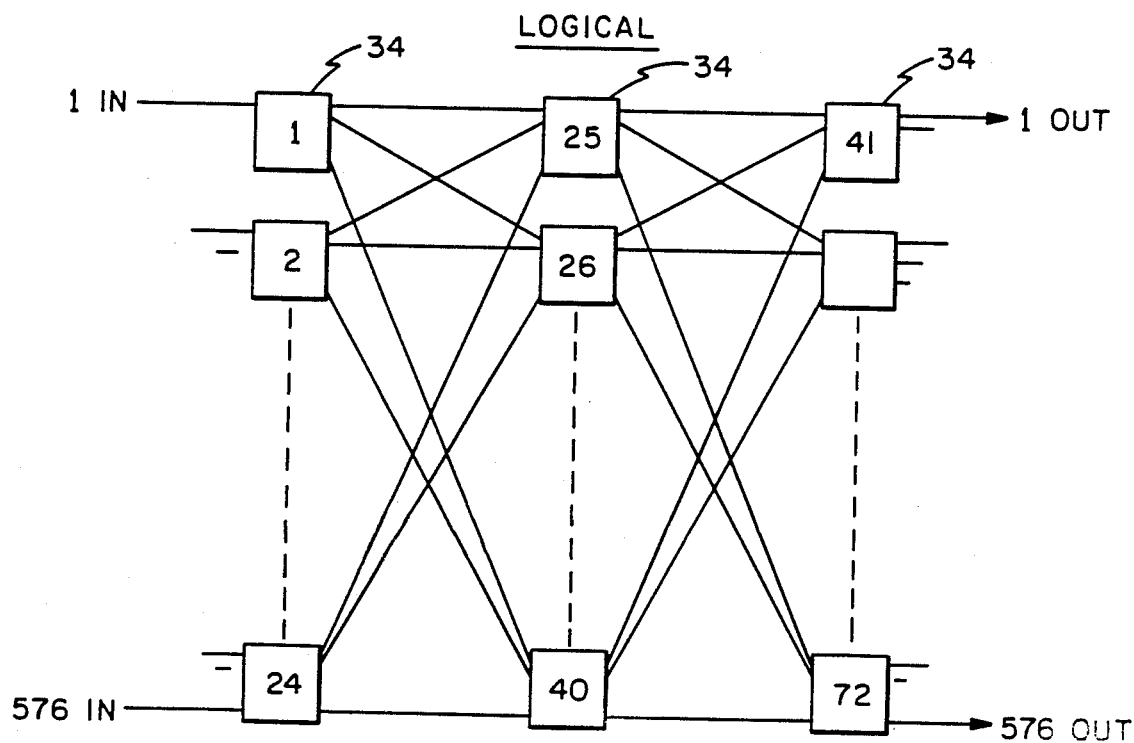

In particular, FIG. 5B shows a very large packet switch. In this particular application, the packet take the specific format of an HDLC "frame". An array of 72 modules 34, in which each module has 24 inputs and outputs for a total of 576 inputs and 576 outputs is shown. We continue to refer to the HDLC frames as packets in order to avoid confusion with T-carrier frames.

Each of the 64,000 bps inputs (each of which in reality is part of a 1.544M bps multiplexed stream) carries a stream of packets from some data source. It is sufficient to route a packet to that one of the 576 outputs which services the destination device for the data. An HDLC frame type of packet is illustrated in FIG. 6.

Figure 6:
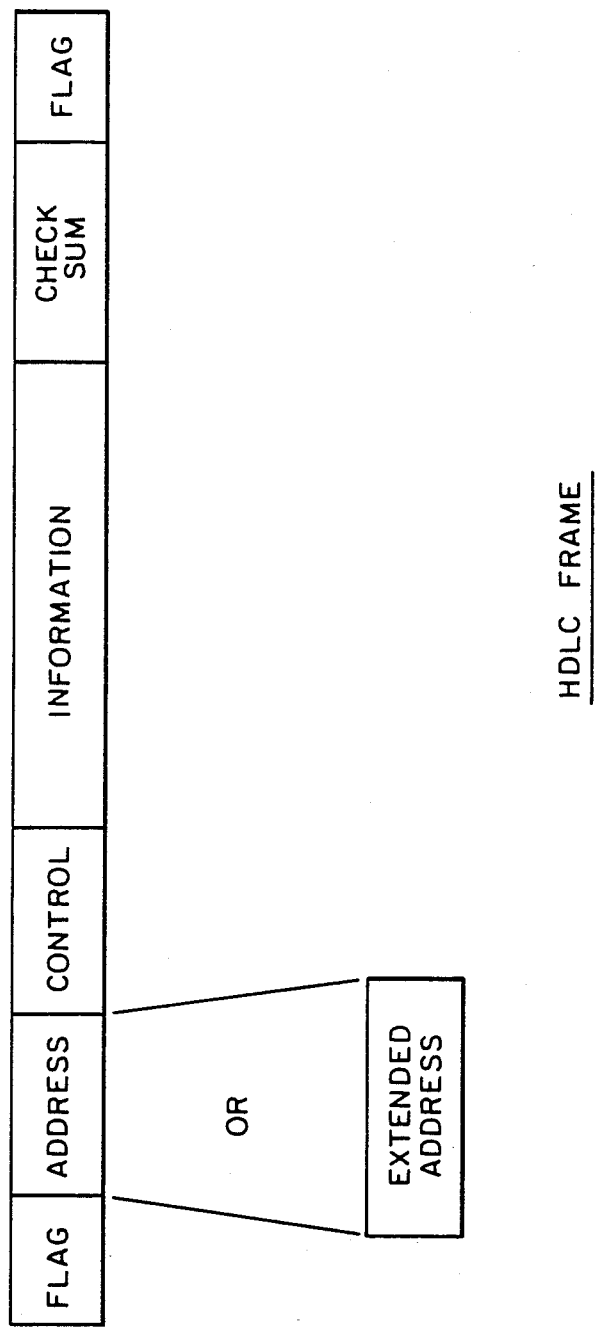
FIG. 6 illustrates a format of a data packet.

As shown in FIG. 6, the packet contains in it an address. For this system, this address corresponds to the physical system interconnections.

Since these will vary from time to time as the system is reconfigured, provision is made in the system for the user wishing to send data to supply a logical address to the system controllers 50 and 52, and to obtain the current physical address. This is done for each call, where a call here is defined as a sequence of packets sent from a single source to a single destination over a period short enough that the physical configuration of the system does not change. Using a postal system analogy there are 576 streams of letters entering FIG. 5B which might correspond to data from 576 cities. The task of the overall array of 72 modules is to examine each letter for the city address and to route it out on the appropriate one of 576 trunks. This is done in 3 stages here and no one module deals with more than one 24 channel input and one 24 channel output.

One key feature of this system is the address mechanism discussed above. Current technology utilizes addresses which are essentially unrelated to the physical system configuration, and then requires each node in the systems to utilize gigantic tables to decode these addresses to do physical routing. In this system only the system controller must do this. The system controller then supplies each date source with the current physical address, which is placed in the packet (on the letter). Since this physical address is structured according to the physical system configuration, individual routing modules now need only small tables which are concerned with their own area of the system—not the whole system. These modules, for example, will in general look only at a portion of the total address.

While the need for the user to obtain and use the current physical address of the destination party may seem like a step backwards in generality, it is actually a very powerful tool for reducing the complexity of the switching module, and is performed automatically as mentioned later.

The use of the physical address permits the individual switching modules 34 to be small, fast, and utilize small tables related only to their own area of the network. A large number of these modules 34 can be connected to operate in parallel as shown in FIG. 5B.

In particular, FIG. 5B shows an array of 72 modules which provide a connectivity of 576×576 64,000 bps circuits for a total of 36,864,000 bps, yet each individual module in the array 34 need only be concerned with 1.532 bps of information in and out. The use of this modular approach permits the construction of very large data switches in which no one individual element need be extremely powerful.

Referring now to FIG. 4, 24 multiplexed channel of data arrive in a bit serial format on the 1.544M bps multiplexed T-carrier circuits. A T-carrier frame of 24 bit bytes, which is 192 bits plus one framing bit for a total of 193 bits per frame. These bites bear no particular relationship to the packet boundary. Corresponding bytes in a sequence of frames from a 64,000 bps channel. Thus, the module 34 must:

1. Continuously examine each 64,000 bps circuit as a bit serial circuit;
2. Locate the beginning and end of messages;
3. Check the error detection checksum at the end of the message to determine that it has no errors;
4. Temporarily store the message;
5. Examine the address portion of the message relevant to that section of the network and determine the proper outgoing line;
6. Continue to temporarily store the message;
7. Transmit the message on the proper outgoing line when space is available.

With reference to FIG. 4, the modular packet switch module 34 is assumed to consist of 24 line processors 38 each of which is responsible for one incoming and one outgoing 64,000 bps circuit. It also includes a single routing and control processor 40, and a common memory 39 accessible to all 25 units. In operation, steps 1, 2, 3 and 4, are performed by the line processor 38 responsible for a particular incoming line; step 5 is performed by the routing and control processor 40; and step 7 is performed by the line processor 38 responsible for the outgoing line. The storage of steps 4 and 6 takes place in common memory 39.

For simplicity, the steps of multiplexing and de-multiplexing the 24 channels of the incoming and outgoing T-carrier lines to the individual processors are simply suggested in the figure by lines and arrowheads.

In operation, the incoming line processor 38 performs steps 1, 2 and 3, and stores the message in common memory 38. The location of the message is passed to the routing and control processor 40 and also through common memory 39. The routing and control processor 40 examines the relevant portion of the address and determines the outgoing line. The location of the message is then passed from the control and routing processor 40 to the responsible line processor 38. The outgoing line processor 38 then, when previous messages have been sent, pulls the message from common memory 39 and transmits it on the outgoing line.

Each "64,000 bps line" is, in reality, a 64,000 bps multiplexed section of a single 1.544M bps T-carrier circuit with 24 such lines.

FIG. 6 shows an HDLC frame form of packet with the extended address. Each switching module 34 in the system is concerned with some portion of the address. The address might roughly correspond to country: state: city: Business: computer: process.

A switching module 34 in a business switching office might only be concerned with the computer and process elements of the address for incoming messages because all the higher order address elements would have been processed previously. On outgoing messages it might be concerned only with the country or state elements.

Figure 7:
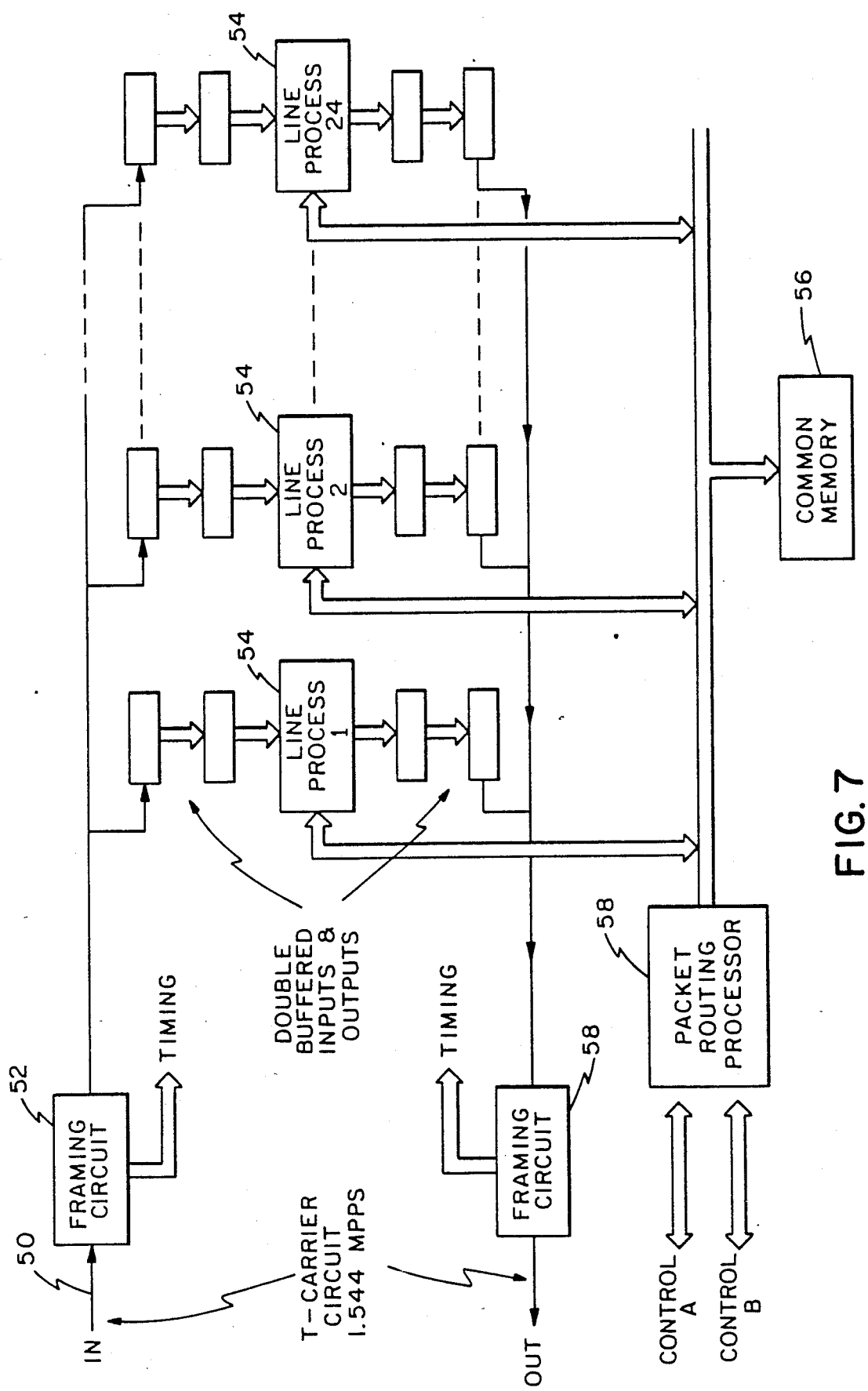
FIG. 7 is a more detailed diagram of the FIG. 4 packet switching module.

FIG. 7 shows a more detailed block diagram of the module with the multiplexing shown explicitly.

In FIG. 7, we see that an incoming T-carrier circuit 50 enters the module and the correct frame position is found by framing circuit 52. Then individual 8-bit segments corresponding to the twenty-four channels are distributed to twenty-four individual microprocessors. The sequential stream of bytes arriving at each line microprocessor 54 as treated as a bit serial data stream and HDLC frame-type packets are identified by scanning for the synchronization pattern which is the "Flag" field of FIG. 6.

The processor 54 then determines the length of the block from the data in the "central" field of FIG. 6, and computes and checks the checksum. Space is obtained in common memory 56. The frame is then loaded in common memory 56, and its location is identified to the control and routing processor 58, perhaps by leaving a message in common memory 56.

the control and routing processor 58 examines the address to determine the proper outgoing line and identifies the location of the message to the line processor handling the outgoing line.

This outgoing processor 54 then extracts the message from memory 56 and transmits it by means of transmitting unit 58 in 8-bit segments as requested by the T-carrier multiplexer.

The invention is not limited to the particular details of the apparatus and method depicted and other modifications and applications are contemplated. For example, other packet formats besides HDLC could be used. Live processors 54 could handle more than one channel. Incoming and outgoing channels could be handled by separate processors. The packet routing processor 58 might not communicate with common memory, or might communicate only through common memory, or memory might not be common and the packet might be passed from the memory of the incoming processor to the memory of the outgoing processor. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A packet switching module for connecting to a multiplexed carrier line, the multiplexed carrier line having at least an input and an output, each input and output having a plurality of channels, comprising:

means for receiving an information frame in one or more channels having predetermined format and connected to the input of said multiplexed carrier line;

plurality of means for processing the information frames for rerouting thereof connected to said means for receiving;

means for providing memory connected to said plurality of means for processing and to a means for controlling packet routing; and means for transmitting the information frame and connected to said plurality of means for processing and to the output of the multiplexed carrier line.

2. The packet switching module defined in claim 1 wherein said information frame contains a physical destination address.

3. A packet switching module for connecting to a multiplexed carrier line, said multiplexed carrier line having at least an input and output, each carrying individual information channels said channels carrying information packets, comprising:

means for receiving said information packets connected to the input of said multiplexed carrier line;

plurality of means for processing said information packets for rerouting thereof connected to said means for receiving;

means for temporarily storing said packets received from said means for processing;

means for examining an address portion of said packets stored in said means for temporarily storing said packets;

means for determining from said address portion an output channel for transmitting said packets; and means for transmitting said packets on said output channel determined from said address portions.

4. A method for packet switching having a module for connecting to a multiplexed carrier line carrying individual information frames each of said individual information frames having at least a beginning and an end of a message therein and having a serial format, comprising:

receiving said information frames from said multiplexed carrier line;

processing said received information frames for rerouting thereof;

locating the beginning and end of the message in said processed information frame;

checking an error detection checksum in said message;

temporarily storing said message;

examining an address portion of said message;

determining from said address portion an output destination for said information frame; and transmitting said information frame on said multiplexed carrier line.

5. A packet switching module for connecting to a T−1 carrier line, said T−1 carrier line having at least an input and an output comprising:

means for receiving an information frame having predetermined format and said means for receiving connected to the input of said T−1 carrier line;

plurality of means for processing the information frame for rerouting thereof connected to said means for receiving;

means for controlling packet routing of packets in said information frame connected to each of said means for processing;

means for providing memory to store a message in said information frame connected to said plurality of means for processing and to said means for controlling; and means for transmitting the information frame and connected to said plurality of means for processing and to the output of the T−1 carrier line.

6. A packet switching module for connecting to a T−1 carrier line carrying individual information frames, each of said frames having at least a message with a beginning and an end thereof and having a serial format, comprising:

means for receiving said information frames from said T−1 carrier line;

plurality of means for processing the information frames for rerouting thereof connected to said means for receiving;

means for examining each of said means for processing;

means for locating the beginning and end of a message in the frame;

means for checking an error detection checksum in said message;

means for temporarily storing said message;

wherein said means for examining further comprises means for examining an address portion of said message;

means for determining from said address portion a selected means for processing to output said information frame; and means for transmitting said information frame on said T−1 carrier line, means for providing a bus for interconnecting said plurality of means for processing, said means for examining, said means for checking, said means for temporarily storing, said means for determining and said means for transmitting.

* * * * *